(12) United States Patent
Van Fossen et al.

(10) Patent No.: US 8,913,354 B2
(45) Date of Patent: Dec. 16, 2014

(54) ENCLOSED METERING AND PROTECTIVE ELECTRICAL APPARATUS INCLUDING AN EXTERNAL DISCONNECT HANDLE

(75) Inventors: Andrew L. Van Fossen, Bloomington, IL (US); Jeffrey L. Johnson, Lincoln, IL (US); David R. Welsh, Orlando, FL (US); Matthew D. Occhipinti, East Peoria, IL (US); James L. Gehlbach, Lincoln, IL (US)

(73) Assignee: Eaton Corporation, Cleveland, OH (US)

( * ) Notice: Subject to any disclaimer, the term of this patent is extended or adjusted under 35 U.S.C. 154(b) by 302 days.

(21) Appl. No.: 13/450,571

(22) Filed: Apr. 19, 2012

(65) Prior Publication Data

US 2013/0279049 A1   Oct. 24, 2013

(51) Int. Cl.
*H02H 9/08* (2006.01)

(52) U.S. Cl.
USPC .......................................... 361/42; 200/43.14

(58) Field of Classification Search
CPC ................................. H02H 3/16; Y02T 90/14
USPC .......................................... 361/42; 200/43.14
See application file for complete search history.

(56) References Cited

U.S. PATENT DOCUMENTS

| | | | | |
|---|---|---|---|---|
| 1,383,781 A | * | 7/1921 | Ball | 200/43.14 |
| 4,038,626 A | * | 7/1977 | Haydu et al. | 337/4 |
| 5,775,942 A | * | 7/1998 | Jeffcoat | 439/517 |
| 5,834,932 A | * | 11/1998 | May | 324/107 |
| 6,081,205 A | * | 6/2000 | Williams | 340/932.2 |
| 6,940,027 B1 | | 9/2005 | Sipe | |
| 2010/0296230 A1 | | 11/2010 | Storck et al. | |
| 2011/0169447 A1 | * | 7/2011 | Brown et al. | 320/109 |

FOREIGN PATENT DOCUMENTS

| | | |
|---|---|---|
| WO | 2004/032304 A2 | 4/2004 |
| WO | 2011/019509 A1 | 2/2011 |

OTHER PUBLICATIONS

IEEE, The Authoritative Dictionary of IEEE Standards Terms, 2000, Standards Information Network IEEE Press, Seven Edition, 169.*
European Patent Office, "Invitation and partial International Search", Nov. 11, 2013, 6 pp.

* cited by examiner

*Primary Examiner* — Rexford Barnie
*Assistant Examiner* — Tien Mai
(74) *Attorney, Agent, or Firm* — Eckert Seamans Cherin & Mellott, LLC; Philip E. Levy; Kirk D. Houser

(57) ABSTRACT

An enclosed metering and protective electrical apparatus includes an enclosure, a meter socket within the enclosure structured to input a power circuit and to engage a power meter, and a circuit interrupter within the enclosure including an operating handle and a trip mechanism. The circuit interrupter is structured to output the power circuit from the meter socket to a load and to interrupt the power circuit. A neutral current sensor within the enclosure is structured to detect a ground fault operatively associated with the power circuit and responsively cause the trip mechanism of the circuit interrupter to interrupt the power circuit. A disconnect handle substantially external to the enclosure includes linkage extending within the enclosure and cooperating with the operating handle of the circuit interrupter to open and close the circuit interrupter.

17 Claims, 6 Drawing Sheets

ENCLOSED METERING AND PROTECTIVE ELECTRICAL APPARATUS INCLUDING AN EXTERNAL DISCONNECT HANDLE

BACKGROUND

1. Field

The disclosed concept pertains generally to enclosed electrical apparatus and, more particularly, to enclosed metering and protective electrical apparatus.

2. Background Information

It is believed that known devices for electric vehicle chargers do not include a meter and a circuit breaker with various options, such as tap lugs, neutral current sensing devices and surge protection devices in a single enclosure. The known devices might include a raintight loadcenter (or residential panelboard) that connects with additional external conduit and wiring to an external single meter socket device. With both of these devices being their own separate specific entities, field installers would employ the two externally connected devices to meet the need for electric vehicle charger applications. Furthermore, a low profile, circuit breaker toggle would likely be under a cover or door. This would not allow for external operation without the use of tools or additional removal of fasteners. Generally, this requires opening the cover or door and exposing the operator to live parts as well as the internal device components to the external environment. Additionally, a neutral current sensor, tap lugs, surge protection, and other options would only be available for field installations. This requires the field installer to either purchase and/or maintain stock of the appropriate components specifically for electric vehicle charger applications or face delays until they secure the additional components.

An external disconnect handle is known to be used in applications such as safety switches.

Fire or rescue personnel need to disconnect distribution power quickly in many cases. Activating or de-activating a circuit breaker at its operating handle is extremely difficult when wearing heavy duty gloves and continues to be an issue for fire and rescue personnel. For example, most circuit breaker operating handles are usually of a relatively low profile and are made for bare hand access. Operating a circuit breaker operating handle with these types of gloves is not generally easy and may require removal of protection that the rescue personnel need.

There is room for improvement in metering or protective electrical apparatus.

SUMMARY

In accordance with the disclosed concept, an enclosed metering and protective electrical apparatus comprises: an enclosure; a meter socket within the enclosure, the meter socket being structured to input a power circuit and to engage a power meter; a circuit interrupter within the enclosure, the circuit interrupter comprising an operating handle and a trip mechanism, the circuit interrupter being structured to output the power circuit from the meter socket to a load and to interrupt the power circuit; a neutral current sensor within the enclosure, the neutral current sensor being structured to detect a ground fault operatively associated with the power circuit and responsively cause the trip mechanism of the circuit interrupter to interrupt the power circuit; and a disconnect handle substantially external to the enclosure, the disconnect handle comprising a linkage extending within the enclosure, the linkage cooperating with the operating handle of the circuit interrupter to open and close the circuit interrupter.

The enclosure may comprise a door structured to open and provide access to the circuit interrupter and the neutral current sensor; and the door and the disconnect handle may cooperatively provide an interlocking mechanism structured to lock the door closed when the circuit interrupter is closed and can energize the load.

The enclosure may include a plurality of sides defining an interior and an opening to the interior; the enclosure may further include a door pivotally mounted to the enclosure proximate the opening; the door may include an interlock member coupled to the door and extending into the interior of the enclosure when the door closes the opening of the enclosure; the linkage of the disconnect handle may engage the interlock member of the disconnect handle in a closed position of the circuit interrupter in order to prevent opening of the door; and the linkage of the disconnect handle may disengage from the interlock member of the disconnect handle in an open position of the circuit interrupter in order to permit opening of the door.

BRIEF DESCRIPTION OF THE DRAWINGS

A full understanding of the disclosed concept can be gained from the following description of the preferred embodiments when read in conjunction with the accompanying drawings in which:

FIG. 12 is a side vertical elevation view of a portion of the enclosed metering and protective electrical apparatus of FIG.

3 showing the disconnect handle in the off position with a door open and a door interlock preventing movement of the disconnect handle.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

Referring to FIGS. 1-4, an enclosed metering and protective electrical apparatus 2 is shown. The apparatus 2 includes an enclosure 4 and a meter socket 6 (e.g., without limitation, a test block or manual-bypass) within the enclosure 4. The meter socket 6 is structured to input a power circuit 8 and to engage a power meter (not shown; installed, for example, by a utility company). The apparatus 2 further includes a circuit interrupter, such as the example main circuit breaker 10, within the enclosure 4. The power circuit 8 is input by the meter socket 6, passes through the circuit breaker 10, and is output to a load 16 (shown in phantom line drawing in FIG. 3). The circuit breaker 10 includes an operating handle 12, line terminals 13, a trip mechanism 14 and load terminals 15, and is structured to interrupt the power circuit 8. A neutral current sensor 18 is within the enclosure 4 and is structured to detect a ground fault operatively associated with the power circuit 8 and responsively cause the circuit breaker trip mechanism 14 to interrupt the power circuit 8. The neutral current sensor 18 (e.g., without limitation, a current transformer) cooperates with the circuit breaker trip mechanism 14 (e.g., without limitation, a trip unit) to monitor the power circuit 8 for abnormalities. In the example embodiment, the neutral current sensor 18 is structured to monitor the return current to see if there is a loss of 30 mA or greater due to a ground fault. If a ground fault, or any other loss of current greater than 30 mA is detected, then the trip mechanism 14 trips the circuit breaker 10 responsive to a shunt trip input 20.

The apparatus 2 also includes a disconnect handle 22 (e.g., without limitation, a safety switch) substantially external to the enclosure 4 and including a linkage, such as the example cross arm 24, extending within the enclosure 4. The cross arm 24 cooperates with the circuit breaker operating handle 12 to open and close the circuit breaker 10. As will be described below in connection with FIGS. 9-12, the disconnect handle 22 permits the door 26 of the enclosure 4 to remain closed when connecting or disconnecting the power circuit 8 to or from the load 16 by the circuit breaker 10. Furthermore, the apparatus 2 includes additional structures to prevent the door 26 from being opened when the circuit breaker 10 is closed.

Example 1

In the example shown in FIGS. 1-4, the meter socket 6 is a test block meter socket for the load 16, which can be, for example and without limitation, a number of electric vehicle chargers or other suitable devices.

Example 2

Also referring to FIGS. 9-12, the enclosure 4 of FIGS. 1-4 includes a plurality of sides 28,30,32,34,36 defining an interior 38 and an opening 40 to the interior 38. The opening 40 has an upper portion 41, and the enclosure door 26 (not shown in FIGS. 9 and 11) is pivotally mounted to the enclosure 4 proximate the opening upper portion 41. For example, the enclosure door 26 is pivotally mounted to the enclosure 4 by hinges 42 proximate the opening 40. The door 26 includes an interlock member, such as the example door interlock bracket 44, coupled to the door 26 and extending into the interior 38 of the enclosure 4 when the door 26 closes the enclosure opening 40. The disconnect handle cross arm 24 engages the door interlock bracket 44 in a closed or on position (FIGS. 9 and 10) of the circuit breaker 10 in order to prevent opening of the door 26. The disconnect handle cross arm 24 disengages from the door interlock bracket 44 in an open or off position (FIGS. 11 and 12) of the circuit breaker 10 in order to permit opening of the door 26. The door interlock bracket 44 is captured by the cross arm 24 in the closed or on position, and is free in the open or off position of the circuit breaker 10. When the circuit breaker 10 is closed, the door interlock bracket 44 is under the cross arm 24, which retains the bracket 44 and the door 26 and effectively denies access to live parts in the distribution section 46 of the apparatus 2. This advantageously provides for customer safety by denying access to live parts with the circuit breaker 10 in the closed or on position.

Example 3

The load 16 (FIG. 3) can be a number of electric vehicle charging stations.

Example 4

The trip mechanism 14 (FIG. 3) can be, for example and without limitation, an electronic trip unit or a thermo-magnetic trip circuit.

Example 5

In the example embodiment, the trip mechanism 14 includes the shunt trip input 20, and the neutral current sensor 18 includes an output 48 structured to actuate the shunt trip input 20.

Example 6

The enclosure 2 can further enclose a surge protector 50 structured to protect the power circuit 8 from power surges.

Example 7

The enclosure 2 can also enclose a plurality of access points 52 to the power circuit 8 from, for example, an inverter (not shown).

Example 8

The example apparatus 2 can provide power to and/or monitor power for electric vehicle charging stations. The meter socket 6 for incoming power from the power circuit 8 feeds the circuit breaker 10, which includes the trip mechanism 14. The circuit breaker 10 is manually operated by the external disconnect handle 22 for customer safety during operation as well as security. As will be described, the enclosure 4 and the external disconnect handle 22 cooperatively provide an interlocking mechanism to safely manually operate the distribution power and/or lock the main circuit breaker 10 from operation.

Example 9

The apparatus 2 may optionally include a variety of accessory options and features, such as, for example and without limitation, the example surge protector 50, and access for photovoltaic tap connections and inverters, such as through the example access points 52.

Example 10

The apparatus 2 may be constructed in a variety of sizes, amperages, socket styles, circuit breaker configurations and enclosures, as well as pedestal style options.

Example 11

Solar inverters (not shown) convert DC power from solar panels (not shown) into AC power for use in typical electrical distribution systems (not shown). The solar inverters capable of connecting to the example apparatus 2 are grid tie converters (not shown). A grid tie converter utilizes a monitoring package (not shown) that synchronizes the sine waves of the AC power to that of the utility system (not shown) and also monitors for power outages. If utility power is lost, the solar inverter will disconnect and, thus, not back-feed power onto the utility distribution system, which would otherwise create a hazardous condition for utility line workers. If the solar inverter is not a grid tie converter, then the access points 52 (e.g., tap lugs) would not be able to be placed on the line side of the circuit breaker 10. The tap lugs would, instead, be placed downstream of the circuit breaker 10 and contain a mechanically interlocked system (not shown) to prevent the utility power and solar power from being on at the same time.

Example 12

The access points 52 (e.g., tap lugs) are electrically coupled to the power circuit 8. These tap lugs provide access points to electrically connect to the A, B, C and neutral phases of the meter socket 6. A neutral (e.g., without limitation, from a utility company; operatively associated with the power circuit 8) is electrically coupled to a neutral connector 49, which is electrically connected to a bus (not numbered) that is electrically coupled to a bolted connection 51 of the neutral current sensor 18. The neutral connector 49 is also grounded/bonded to the enclosure 4. The other bolted connection 53 of the neutral current sensor 18, when field installed, is electrically connected to and provides the neutral to the load 16. Another conductor (not numbered) electrically connects the meter (not shown) to the neutral. A neutral tap lug, when needed, would be field installed at the bolted connection 53 of the neutral current sensor 18. This allows field personnel to determine the appropriate lug according to wire size requirements for a particular application. The tap lugs are electrically coupled to the power circuit phase conductors at any suitable locations where phase conductor insulation (shown, but not numbered) is removed. The tap lugs can serve as electrical connection points to power a variety of options, such as, for example and without limitation, the example surge protector 50, and other external or internal electrical connections for photovoltaic (solar) or other applications. Additional tap lugs may be added if further electrical connections are desired for other options.

Example 13

Tamper resistance for the apparatus 2 is accomplished by sealing the external handle 54 of the disconnect handle 22 through holes 56 in the handle shroud 58. This may be accomplished in either the on (FIGS. 1-4) or off (FIGS. 11 and 12) positions of the disconnect handle 22, since the handle shroud 58 is securely coupled to the enclosure 4. The apparatus 2 is sealable and the distribution door 26 is interlocked to the disconnect handle 22 to keep the distribution door 26 closed while the circuit breaker 10 is in the closed or on position. This is advantageously used for urban areas that encounter significant incidences of power theft. The need for additional security is paramount to protecting the apparatus 2, the public, and to ensure uninterrupted powering of the load 16 (e.g., without limitation, electric vehicle chargers).

Example 14

The disconnect handle 22 includes a securing mechanism 60 (e.g., without limitation, a lock; another suitable sealing mechanism; a padlock; a utility seal; a wire seal; a tie wrap; another suitable securing structure depending upon the user's choice and desired level of tamper resistance to defeat the operation of the disconnect handle 22), the elongated external handle 54 having a number of first holes 62 (shown in hidden line drawing in FIG. 2), and the handle shroud 58 having a number of the second holes 56. A number of the number of second holes 56 is structured to align with a number of the number of first holes 62 in a number of different positions of the elongated external handle 54. The securing mechanism 60 is structured to secure the elongated external handle 54 in one of the number of different positions.

Example 15

The elongated external handle 54 has the on position (FIGS. 1-4) and the off position (FIGS. 11 and 12) and is structured to be secured by the securing mechanism 60 in both of the on and off positions.

Example 16

Unlike the low profile circuit breaker operating handle 12, the elongated external handle 54 of the disconnect handle 22 is not a low profile handle.

Example 17

Figure 10:
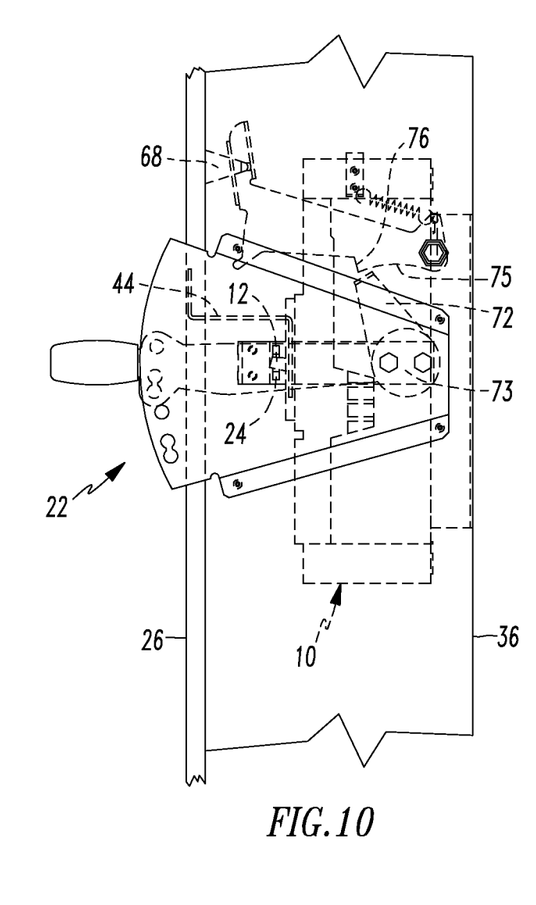
FIG. 10 is a side vertical elevation view of a portion of the enclosed metering and protective electrical apparatus of FIG. 3 showing the disconnect handle in the on position with a door closed and a door interlock permitting movement of the disconnect handle.
Figure 11:
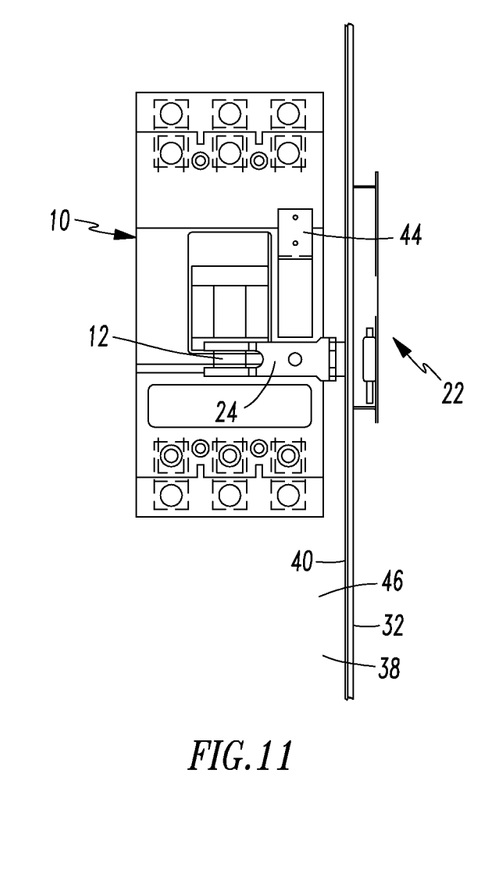
FIG. 11 is a vertical elevation view of a portion of the enclosed metering and protective electrical apparatus of FIG. 3 showing a disconnect handle and a circuit breaker in the off position with a door interlock bracket in a free position.
Figure 12:
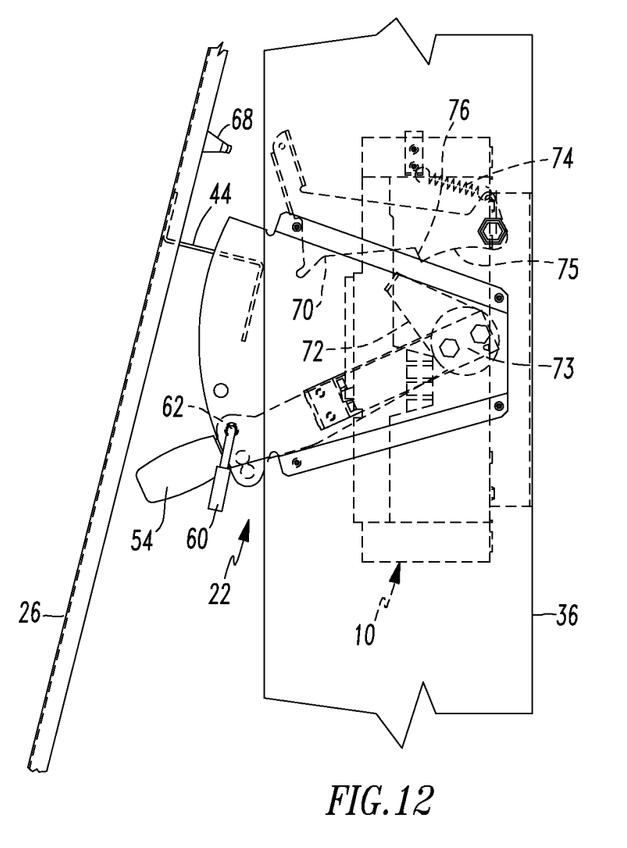

The example sealing features are the number of holes 56 in the handle shroud 58 that match up to the number of holes 62 (shown in hidden line drawing in FIG. 2) in the external handle 54 for sealing (securing) the elongated external handle 54 in the off position (FIGS. 11 and 12). These holes 56,62 can also be employed, as shown, for the on position (FIGS. 1-4, 9 and 10) as well if deemed necessary for uninterrupted power. The security (sealing) features are used in conjunction with the example securing (sealing) mechanism 60 to create a viable mechanism for tamper detection as well as for deterring vandals and preventing power theft.

Example 18

Figure 1:
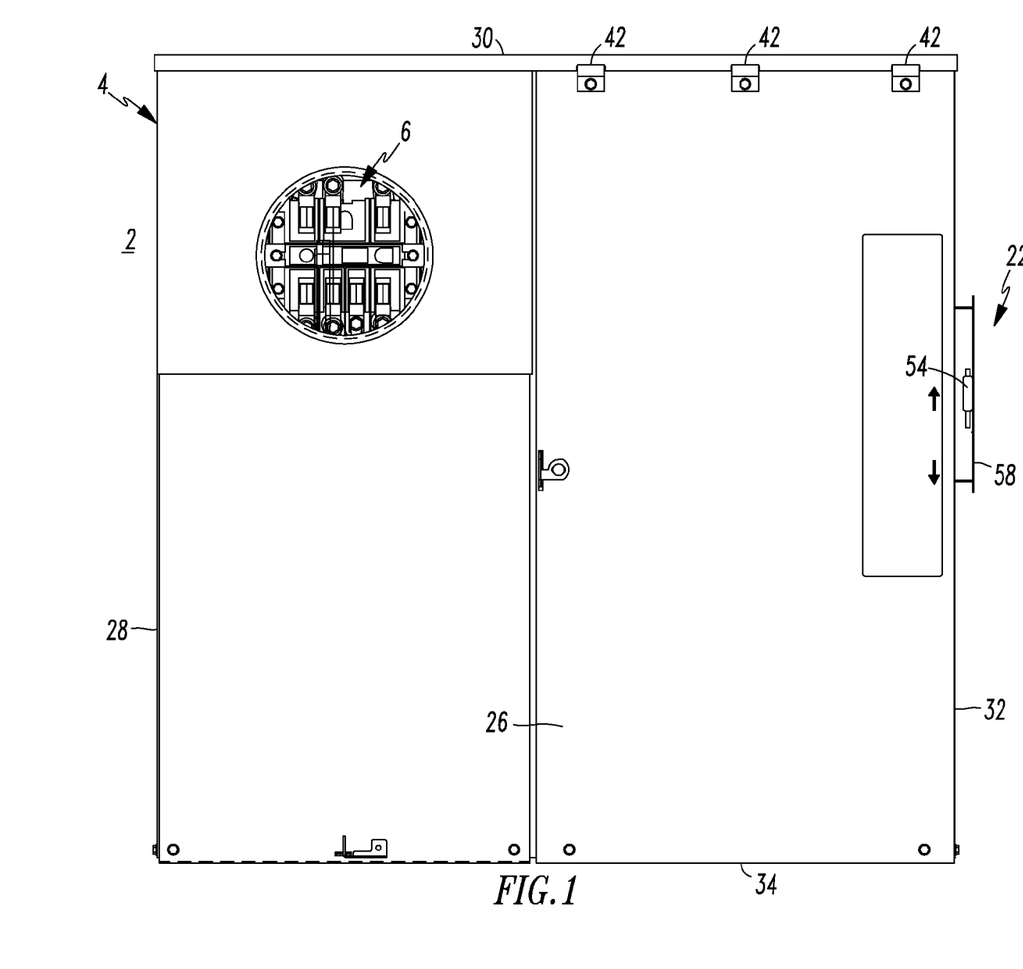
FIG. 1 is a vertical elevation view of an enclosed metering and protective electrical apparatus in accordance with embodiments of the disclosed concept.
Figure 2:
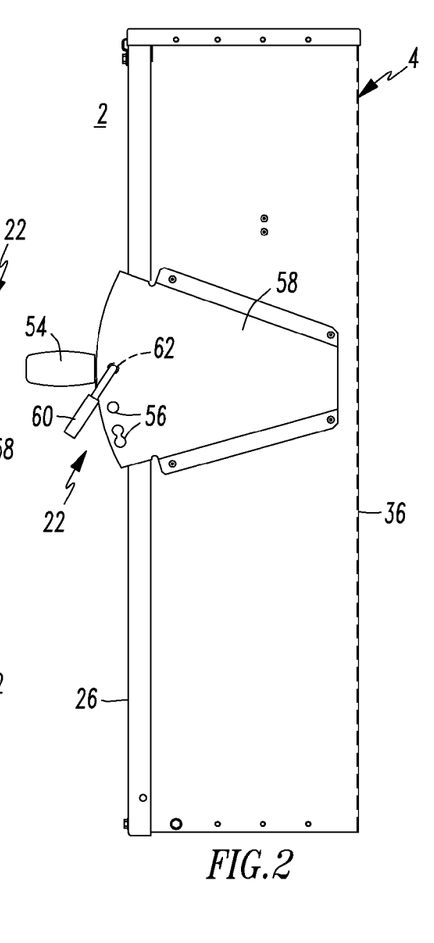
FIG. 2 is a side vertical elevation view of the enclosed metering and protective electrical apparatus of FIG. 1.
Figure 3:
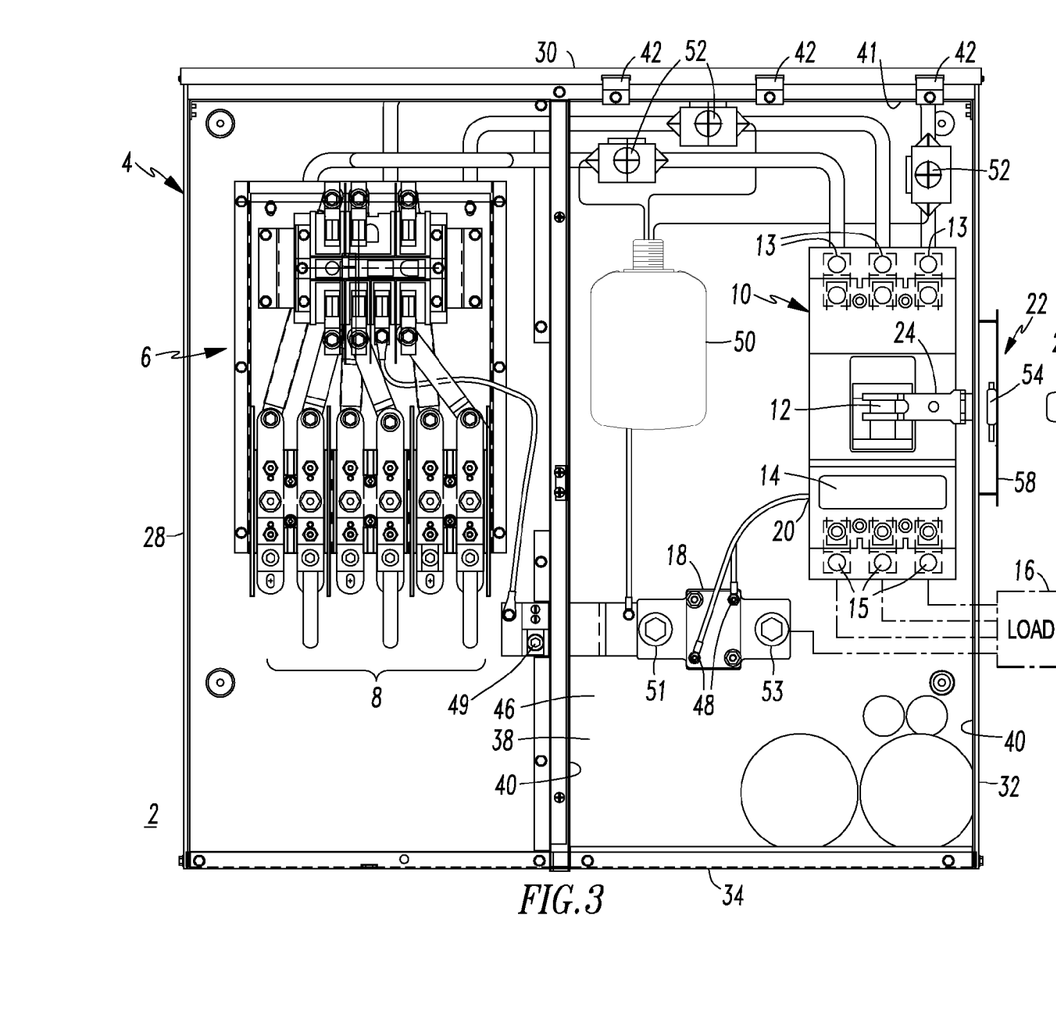
FIG. 3 is a vertical elevation view of the enclosed metering and protective electrical apparatus of FIG. 1 with a front cover and door removed to show internal structures.
Figure 4:
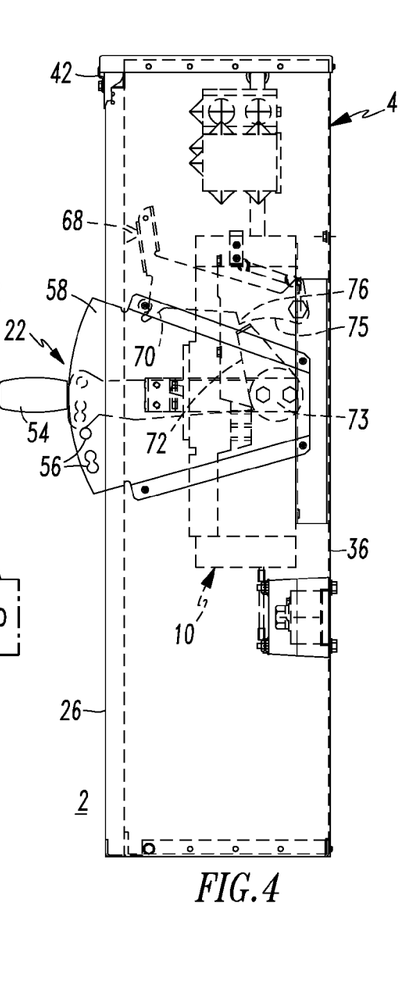
FIG. 4 is a side vertical elevation view of the enclosed metering and protective electrical apparatus of FIG. 1 with a side panel removed to show internal structures.
Figure 5:
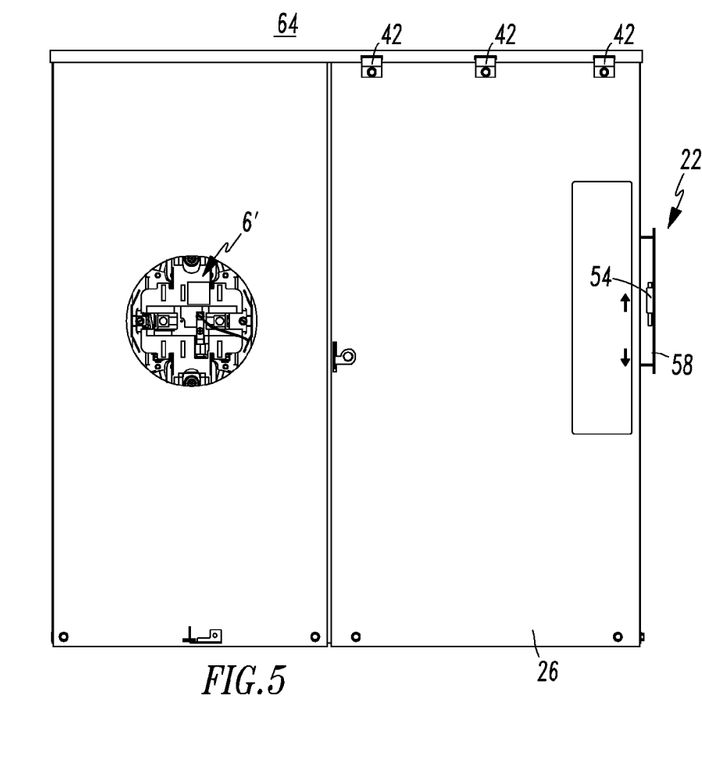
FIG. 5 is a vertical elevation view of an enclosed metering and protective electrical apparatus in accordance with another embodiment of the disclosed concept.
Figure 6:
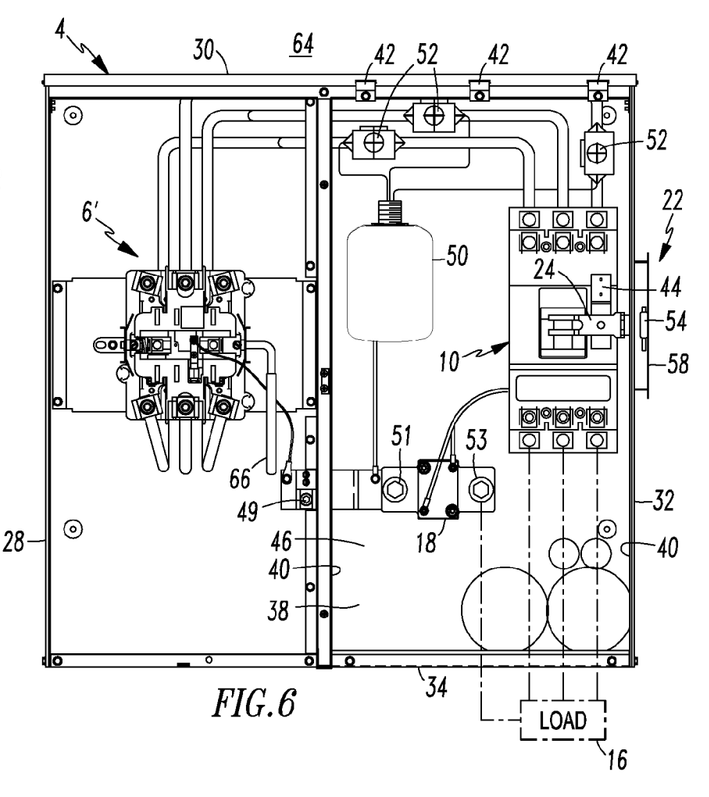
FIG. 6 is a vertical elevation view of the enclosed metering and protective electrical apparatus of FIG. 5 with a front cover and door removed to show internal structures.

FIGS. 5 and 6 show another enclosed metering and protective electrical apparatus 64, which is similar to the apparatus 2 of FIGS. 1-4. In FIGS. 5 and 6, the meter socket 6' is a lever bypass meter socket for the load 16 (shown in phantom line drawing), such as a number of electric vehicle chargers.

Example 19

The only differences between the meter sockets 6,6' are the meter socket styles and the bypassing of the metered current.

The test block meter socket 6 of FIGS. 1-4 is a manual-bypass meter socket. This can include a five-jaw or seven-jaw configuration and is mechanically changed (e.g., by removing fasteners and bus connection(s) to bypass the utility meter (not shown)). The lever bypass meter socket 6' of FIGS. 5 and 6 is a lever-activated bypass meter socket. This can include a five jaw or seven-jaw configuration and is manually activated by a lever 66 on one side (e.g., without limitation, right with respect to FIG. 6) that releases jaw connections to permit removal of the utility meter (not shown). The lever bypass meter socket 6' cannot be in bypass mode with a utility meter cover (shown, but not numbered, in FIG. 5) in place. Here, the lever 66 (FIG. 6) is not operable or accessible with the meter cover in place (FIG. 5). On the other hand, the test block meter socket 6 can have the utility meter cover (shown, but not numbered, in FIG. 1) in place when bypassing the utility meter (not shown).

Example 20

Figure 7:
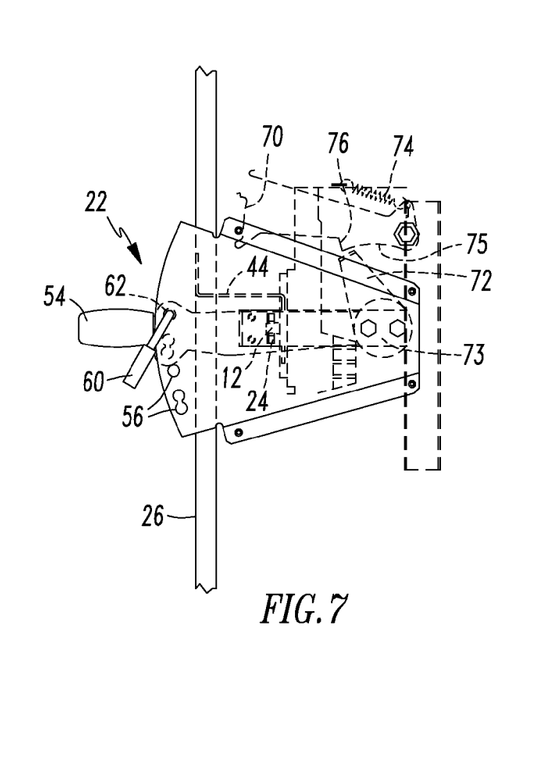
FIG. 7 is a side vertical elevation view of a portion of the enclosed metering and protective electrical apparatus of FIG. 5.

Referring to FIGS. 2, 4, 7, 10 and 12, unlike the disclosed door interlock bracket 44, the disconnect handle 22, the circuit breaker cross arm 24 and the securing mechanism 60 are conventional. Also, a door interlock defeat 68, a biased first interlock lever 70 and a second interlock lever 72 that prevent circuit breaker closure unless the door 26 is closed are also conventional. As shown in FIGS. 7 and 10, with the door 26 closed, the second interlock lever 72, which is coupled to and pivots with the external handle 54 about pivot 73, can freely pivot without obstruction by the first interlock lever 70, which is moved upward and clockwise (with respect to FIG. 7) against the bias of spring 74 by door interlock defeat 68 (as best shown in FIG. 4). Here, the end of the second lever 72 clears a recess 75 of the first lever 70. Conversely, when the door 26 is open (FIG. 12), the first interlock lever 70 is biased downward and counterclockwise (with respect to FIG. 12) by spring 74. Here, the external handle 54 cannot rotate clockwise (with respect to FIG. 12) since the second interlock lever 72 coupled thereto is ultimately blocked by a flange 76 of the first interlock lever 70. This interlocking mechanism safely locks the circuit breaker 10 from operation from the off position to the on position when the door 26 is open.

Example 21

Figure 8:
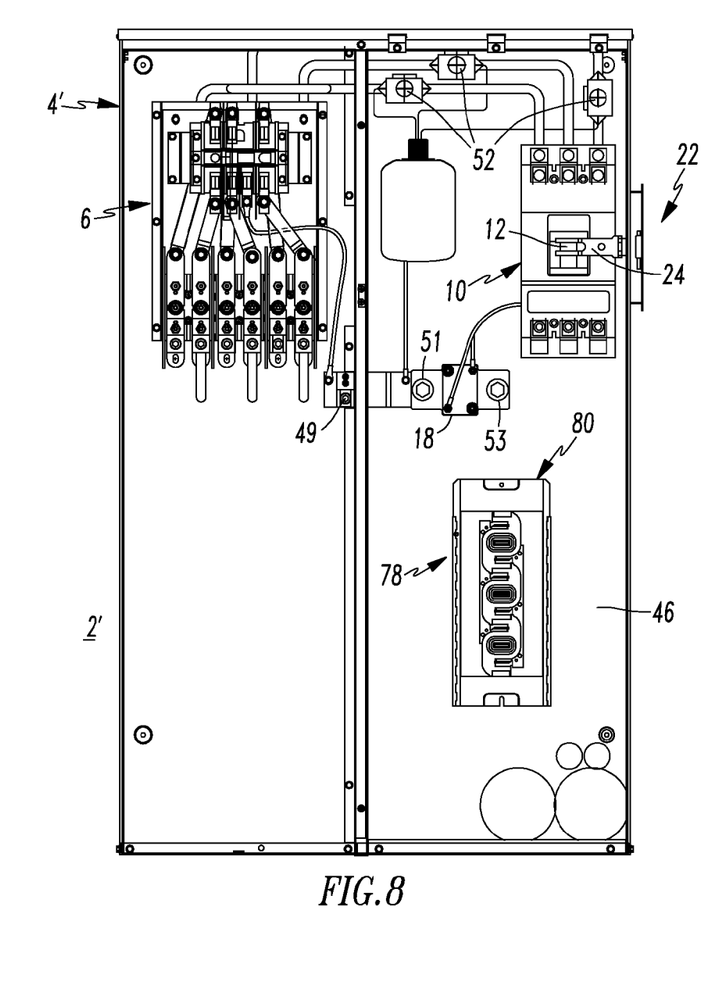
FIG. 8 is a vertical elevation view of an enclosed metering and protective electrical apparatus in accordance with another embodiment of the disclosed concept.
Figure 9:
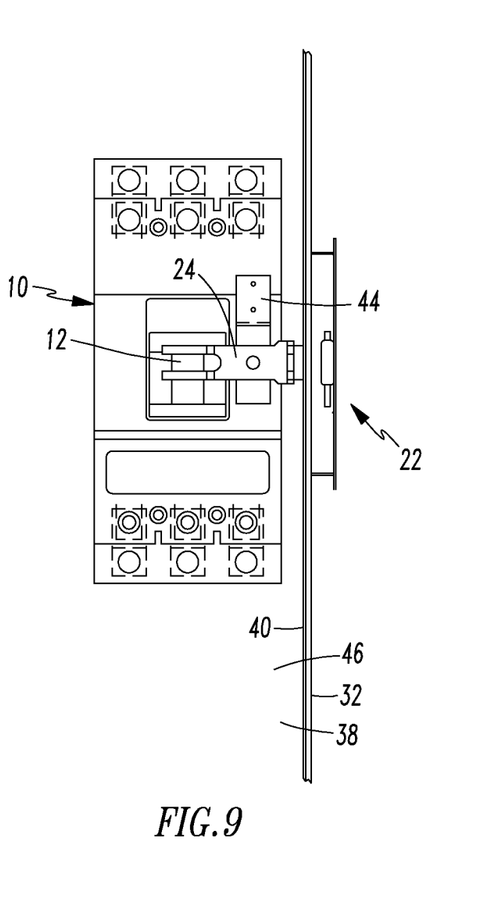
FIG. 9 is a vertical elevation view of a portion of the enclosed metering and protective electrical apparatus of FIG. 3 showing a disconnect handle and a circuit breaker in the on position with a door interlock bracket in a trapped position.

FIG. 8 shows another enclosed metering and protective electrical apparatus 2', which is similar to the apparatus 2 of FIGS. 1-4. Here, the enclosure 4' of the apparatus 2' further encloses a plurality of optional circuits 78 downstream of the circuit breaker 10. The optional circuits 78 are provided by a load center distribution panel 80 that is downstream of the load side of the main circuit breaker 10.

Example 22

Additionally, the example apparatus 2,2',64 may contain optional circuits in addition to the circuit breaker 10. The externally operated disconnect handle 22 permits the user to disconnect the power within the distribution section 46 without exposure to energized components. Accessory options include, for example and without limitation, surge protection, access for photovoltaic tap connections and solar inverters, and optional circuits. The access for photovoltaic tap connections may be achieved by adding access points 52 (e.g., tap lugs) or by using existing tap lugs 52 provided in the apparatus 2,2',64 if not in use for surge protection or other options, including solar inverters. The optional circuits 78 may be achieved by adding wiring (not shown) or a suitable bus connection (not shown) to conduct the load current from the main circuit breaker 10 to the added distribution panel 80 (as shown in FIG. 8). The distribution panel 80 includes wire connectors (not shown) to accept the previously mentioned wires if a bus connection is not used. The number of optional circuits in the apparatus 2' would depend upon the enclosure size and the configuration of any optional features.

Example 23

FIGS. 10 and 12 respectively show the door 26 closed and open to provide access to the circuit breaker 10, the neutral current sensor 18 (FIG. 3) and other energized components of the distribution section 46.

The external disconnect handle 22, which operates the internal circuit breaker operating handle 12 (FIGS. 9 and 11), is coupled to the cross arm 24 that engages the door interlock bracket 44 on the external hinged door 26 and does not allow the door 26 to open when the circuit breaker 10 is in the on position. When the circuit breaker 10 is on, the door interlock bracket 44 is under the cross arm 24, which retains the door 26 and effectively denies access to live parts in the distribution section 46 of the enclosure 4. This interlocking mechanism locks the door 26 closed when the circuit breaker 10 is closed and can energize the load.

Example 24

Fire or rescue personnel need to disconnect distribution power quickly in many cases. The external disconnect handle 22 allows them to disconnect distribution power quickly at the circuit breaker 10 without wasting precious time looking for tools to remove screws or other fasteners to open and unlatch an enclosure cover. Additionally, activating or de-activating a circuit breaker, such as 10, at its operating handle 12 is extremely difficult when wearing heavy duty gloves and continues to be an issue for fire and rescue personnel. While most circuit breaker operating handles are usually of a relatively low profile and are made for bare hand access, the externally activated disconnect handle 22 solves this problem as well. Such a low profile circuit breaker operating handle is common to ensure clearances to covers that enclose a circuit breaker. However, this additionally presents problems as the height of the operating handle itself is limited making finger or thumb activation acceptable, but heavy-duty gloves that are heat and moisture resistant are stiff and bulky. Operating a circuit breaker operating handle with these types of gloves is not generally easy and may require removal of protection that the rescue personnel need. The external disconnect handle 22 solves this problem with easy access for operation regardless of the equipment being worn. The external disconnect handle 22 eliminates the need to remove special safety equipment as well as allows for the operator to avoid contact with live parts or expose the internal device components to inclement weather conditions.

Example 25

In certain scenarios, the ability to monitor remotely located, electric vehicle charging stations is needed in order for the utility company to charge for the energy being used. In those cases, the disclosed apparatus 2,2',64, which combine a metered safety switch with an external disconnect, can be employed to meter utility power in combination with the electric vehicle charging stations.

Example 26

The disclosed concept provides a safe method of monitoring and safely disconnecting distribution power. The example apparatus 2,2',64 provide a metered, monitored power application with various options that may be used with electric vehicle charging systems or, alternately, in residential or light commercial applications. The apparatus 2,2',64 employ current sensing technology to detect ground fault incidence. The distribution door 26 (e.g., cover) that encloses live parts includes an interlocking mechanism, which prevents access to live parts when the circuit breaker 10 is in the on position. Additionally, external circuit breaker operation by the external disconnect handle 22 not only keeps the user safe, but also protects the internal components of the apparatus 2,2',64 from the elements for inclement weather conditions since the distribution door 26 remains closed until after power is disconnected. The example door interlock bracket 44 is coupled to the interior side of the distribution door 26. When the door 26 is closed and the main circuit breaker 10 is on, the cross arm 24, which is the part of the disconnect handle 22 that engages the circuit breaker operating handle 12, is directly in front of the door interlock bracket 44 of the distribution door 26. This traps the door interlock bracket 44 and effectively retains the distribution door 26, thereby preventing access to live parts in the distribution section 46 of the apparatus 2,2',64 during operation.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An enclosed metering and protective electrical apparatus comprising:
   an enclosure;
   a meter socket within said enclosure, said meter socket being structured to input a power circuit and to engage a power meter;
   a circuit interrupter within said enclosure, said circuit interrupter comprising an operating handle and a circuit breaker trip mechanism, said circuit interrupter being structured to output the power circuit from said meter socket to a load and to interrupt the power circuit;
   a neutral current sensor within said enclosure, said neutral current sensor being structured to detect a ground fault operatively associated with the power circuit and responsively cause the circuit breaker trip mechanism of said circuit interrupter to interrupt the power circuit; and
   a disconnect handle substantially external to said enclosure, said disconnect handle comprising a linkage extending within said enclosure, said linkage cooperating with the operating handle of said circuit interrupter to open and close said circuit interrupter.

2. The enclosed metering and protective electrical apparatus of claim 1 wherein the load is a plurality of electric vehicle charging stations.

3. The enclosed metering and protective electrical apparatus of claim 1 wherein the circuit breaker trip mechanism is selected from the group consisting of a circuit breaker electronic trip unit and a thermo-magnetic trip circuit.

4. The enclosed metering and protective electrical apparatus of claim 1 wherein said enclosure and said disconnect handle cooperatively provide an interlocking mechanism structured to lock said circuit interrupter from operation.

5. The enclosed metering and protective electrical apparatus of claim 1 wherein the circuit breaker trip mechanism comprises a shunt trip input; and wherein said neutral current sensor comprises an output structured to actuate the shunt trip input.

6. The enclosed metering and protective electrical apparatus of claim 1 wherein said enclosure further encloses a surge protector structured to protect the power circuit from power surges.

7. The enclosed metering and protective electrical apparatus of claim 1 wherein said enclosure further encloses a plurality of access points to the power circuit.

8. The enclosed metering and protective electrical apparatus of claim 1 wherein said enclosure further encloses a plurality of circuits downstream of said circuit interrupter.

9. The enclosed metering and protective electrical apparatus of claim 1 wherein said enclosure further encloses a plurality of tap lugs electrically coupled to the power circuit.

10. The enclosed metering and protective electrical apparatus of claim 1 wherein said enclosure comprises a door structured to open and provide access to said circuit interrupter and said neutral current sensor; and wherein said door and said disconnect handle cooperatively provide an interlocking mechanism structured to lock the door closed when said circuit interrupter is closed and can energize the load.

11. The enclosed metering and protective electrical apparatus of claim 1 wherein said disconnect handle is elongated and is not a low profile handle.

12. The enclosed metering and protective electrical apparatus of claim 1 wherein said meter socket is a test block meter socket for an electric vehicle charger.

13. The enclosed metering and protective electrical apparatus of claim 1 wherein said meter socket is a lever bypass meter socket for an electric vehicle charger.

14. The enclosed metering and protective electrical apparatus of claim 1 wherein said enclosure includes a plurality of sides defining an interior and an opening to the interior; wherein said enclosure further includes a door pivotally mounted to said enclosure proximate the opening; wherein said door includes an interlock member coupled to said door and extending into the interior of said enclosure when said door closes the opening of said enclosure; wherein the linkage of said disconnect handle engages the interlock member of said disconnect handle in a closed position of said circuit interrupter in order to prevent opening of said door; and wherein the linkage of said disconnect handle disengages from the interlock member of said disconnect handle in an open position of said circuit interrupter in order to permit opening of said door.

15. The enclosed metering and protective electrical apparatus of claim 14 wherein the opening has an upper portion; and wherein the door is pivotally mounted to said enclosure proximate the upper portion of the opening.

16. An enclosed metering and protective electrical apparatus comprising:
   an enclosure;
   a meter socket within said enclosure, said meter socket being structured to input a power circuit and to engage a power meter;
   a circuit interrupter within said enclosure, said circuit interrupter comprising an operating handle and a trip mechanism, said circuit interrupter being structured to output the power circuit from said meter socket to a load and to interrupt the power circuit;

a neutral current sensor within said enclosure, said neutral current sensor being structured to detect a ground fault operatively associated with the power circuit and responsively cause the trip mechanism of said circuit interrupter to interrupt the power circuit; and a disconnect handle substantially external to said enclosure, said disconnect handle comprising a linkage extending within said enclosure, said linkage cooperating with the operating handle of said circuit interrupter to open and close said circuit interrupter, wherein said disconnect handle comprises a securing mechanism, an elongated handle member having a number of first holes, and a handle shroud having a number of second holes; wherein a number of the number of second holes is structured to align with a number of the number of first holes in a number of different positions of said elongated handle member; and wherein said securing mechanism is structured to secure said elongated handle member in one of said number of different positions.

17. The enclosed metering and protective electrical apparatus of claim 16 wherein said elongated handle member has an on position and an off position; and wherein said elongated handle member is structured to be secured by said securing mechanism in both of the on position and the off position.

* * * * *